Figure 1:
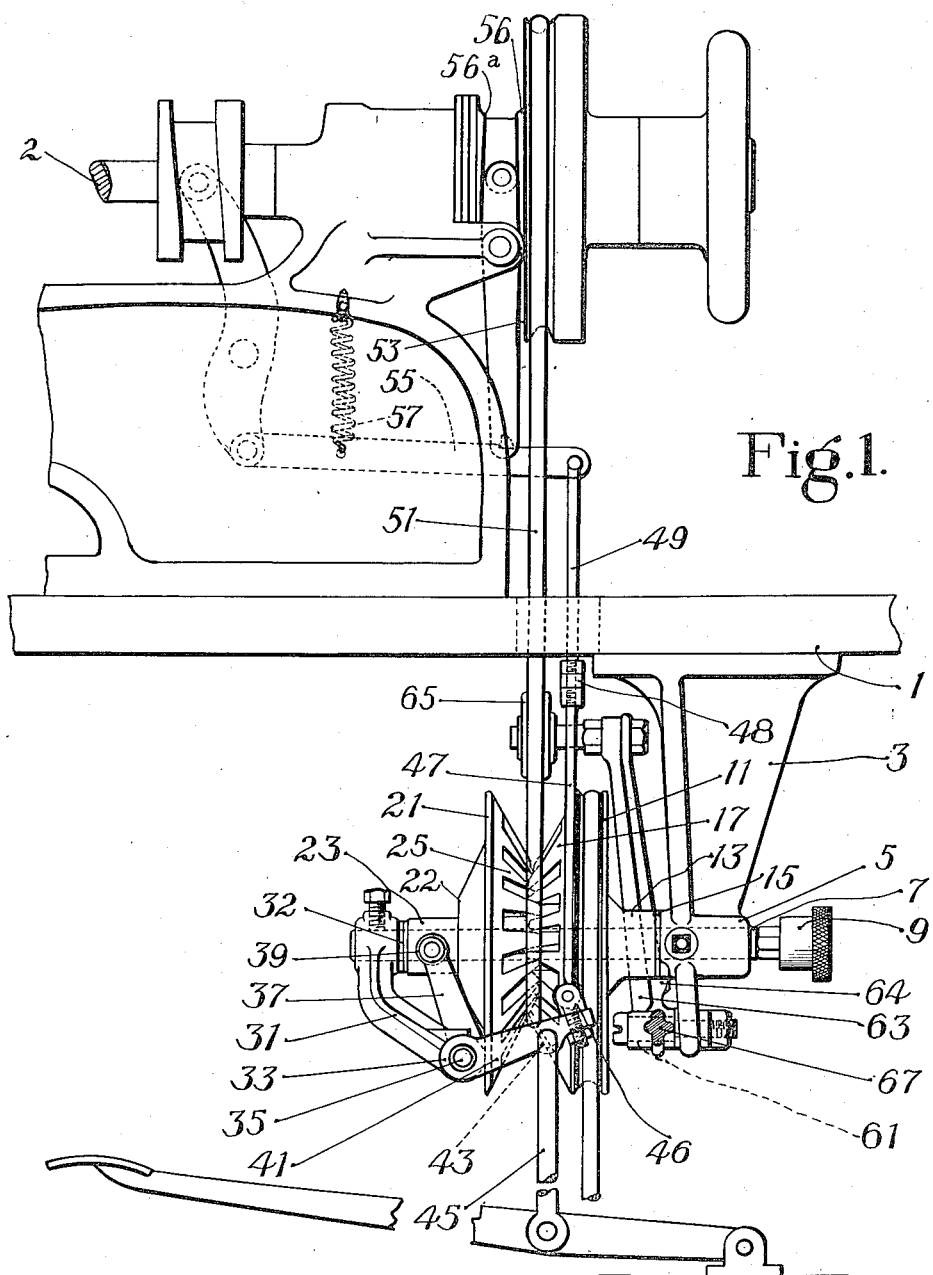

June 4, 1929.　　　J. GOULDBOURN　　　1,715,595
DRIVING MECHANISM
Filed March 8, 1926　　2 Sheets-Sheet 2

INVENTOR
Joseph Gouldbourn
By his Attorney,
Nelson M. Howard

Patented June 4, 1929.

1,715,595

UNITED STATES PATENT OFFICE.

JOSEPH GOULDBOURN, OF LEICESTER, ENGLAND, ASSIGNOR TO UNITED SHOE MACHINERY CORPORATION, OF PATERSON, NEW JERSEY, A CORPORATION OF NEW JERSEY.

DRIVING MECHANISM.

Application filed March 8, 1926, Serial No. 93,276, and in Great Britain April 3, 1925.

The present invention relates to improvements in driving mechanisms and is illustrated as embodied in a variable-speed driving mechanism. Inasmuch as the illustrated mechanism has been especially designed for use in step-by-step shoe upper perforating machines, the invention will be described with particular reference thereto, although it should be understood that in various aspects the invention is not limited to embodiment in such machines.

Step-by-step shoe-upper perforating machines as heretofore constructed have usually been provided with a clutch mechanism of the type in which, after operation of a trip lever, de-clutching occurs at a definite point in the cycle of operations and in which there is produced, upon de-clutching, a braking action designed to bring the parts to rest at or near a pre-determined position in their cycle.

It is desirable that such machines should be capable of being driven at different speeds under different conditions at different parts of one workpiece at the will of the operator, but with ordinary variable speed driving mechanism if a machine is de-clutched at varying speeds the momentum of the parts will vary to such an extent that the braking action may fail to bring the parts to rest with a sufficient degree of accuracy of position. It is desirable also, as these machines are usually operated by girls, to reduce as much as possible the number of the controls, and consequently it is desirable, if possible, to provide for starting and stopping the machine and for varying its speed by the use of a single member, as for example a treadle, and to arrange that the operation of that member shall entail a minimum of physical exertion. It is further desirable that the driving mechanism for such machines shall be as simple as possible, cheap and readily applicable to existing machines. A number of these desiderata could be more or less satisfied by the use of some sort of variable diameter pulley, but in this connection the shape and the small size of the belt used for driving machines of the kind under consideration and the comparatively small space available introduce certain difficulties.

To overcome the difficulties and to satisfy the desiderata above referred to, the present invention provides a novel variable-speed driving and stopping mechanism comprising, as herein illustrated, a driven pulley of fixed diameter, a variable-diameter driving pulley consisting of opposed, intermeshing, coned, pulley parts, a belt connecting these pulleys, and members engaging the belt and the variable-diameter pulley and operative to change the effective diameter of the driving pulley and to take up the belt slack, thereby changing the speed of the driven pulley and at the same time properly tightening the belt, together with connections operative to stop mechanism driven by the driving pulley promptly and with substantial accuracy in a predetermined position, the variable-speed driving mechanism and the stopping means being controlled by a single readily-operable member.

Figure 2:
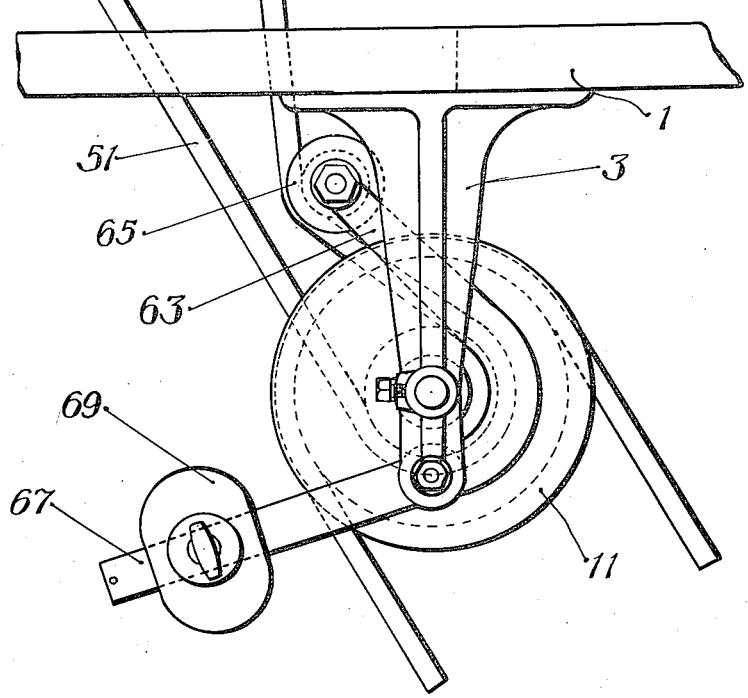
Figure 3:
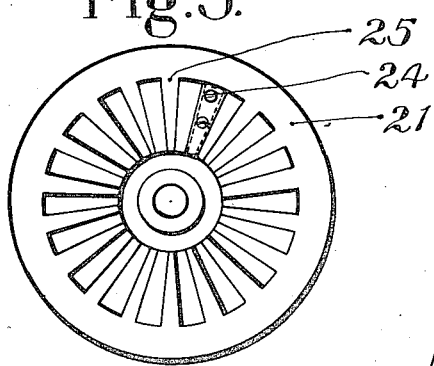

The various objects and the above and other features of the invention will be more fully apparent to those skilled in the art from a consideration of an illustrative construction which embodies the said features in preferred forms in a step-by-step shoe-upper perforating machine and which will now be described with reference to the accompanying drawings in which Fgure 1 is a front elevation, partly in section, of one end of the machine just referred to connected to one form of variable speed mechanism according to the invention, a stopping device associated with the machine being indicated;

Figure 2 is an end elevation, observed from the right of Figure 1, of certain parts of the variable speed mechanism; and Figure 3 is a side elevation of one of the pulley parts of the expanding pulley.

From the underside of a table 1 designed to carry a perforating machine, only the shaft of which is seen at 2, there depends a bracket 3 having near its lower end a boss 5 in which is fixed a shaft 7 bored to provide a conduit for lubrication and having on its end a lubrication cap 9. Mounted on the shaft 7 for free movement both longitudinally and circumferentially thereof is a pulley 11 having a hub 13 between which and the boss 5 is a fibre washer 15, the pulley being constantly driven by a belt from a driving shaft. The pulley 11 on its side remote from the bracket 3 is provided with a number of ribs 17 the outer surfaces of which are at an angle of about 25° to the plane of the pulley as shown in Figure 1. Also mounted on the shaft 7 in such a manner as to be adapted for longitudinal and rotary movement relatively thereto is a member 21 having a vertical face 22, a hub 23 and ribs 25 corresponding to the ribs 17 in number and slope (i. e. for example also at some 25° to the pulley plane) but facing reversely and intermeshing therewith. A bracket 31 is adjustably fixed to the shaft 7 and carries mounted in a boss 33 on its lower end a spindle 35 having fixed to one end thereof an arm 37 carrying at its upper end a roll 39 adapted to contact with the face 22 but somewhat spaced therefrom when the parts are in inoperative position as shown in Figure 1. The other end of the spindle 35 has fixed to it an arm 41 connected at 43 to a rod 45 that is connected to a treadle. Thus on operation of the treadle the roll 39 will act to move the member 21 to increase the effective size of the pulley, while on release of the treadle the member 21 will be free to move outwardly under the pull of the belt 51 hereinafter referred to. It will be seen that the ribs 17 and 25 together form a grooved driving pulley which is connected by an ordinary round belt 51 of small diameter to a pulley 53 on the driving shaft of the perforating machine, and that by varying the position of the member 21 longitudinally of the shaft 7 the effective diameter of the pulley 17, 25 can be varied. It will further be seen that owing to the slope of the ribs 17 and 25 (which never pass out of mesh) a considerable variation in pulley diameter can be obtained by a comparatively small axial movement of the member 21 and, therefore, by a comparatively small movement of the treadle, while at the same time the small round belt will be gripped adequately between meeting inclined faces in every position of the pulley.

Between the hub 23 and the adjacent face of the bracket 31 is a washer 32. The permissible movement between the washer 32 and the hub 23 is so adjusted as to allow of sufficient movement of the member 21 to give the desired variation between the maximum and minimum effective diameters of the pulley 17, 25. The minimum diameter may be varied by adjusting the position of the bracket 31 along the shaft 7, and the maximum diameter may be varied by adjusting the connections between the member 21 and the treadle so as to vary the final inward position to which the member 21 may be moved by the treadle, adjustable stops being preferably provided to limit the range of movement of the treadle. It will be understood that when the hub 23 is seated against the washer 32 the roll 39 can move away from the face 22 so that there is between these latter parts lost motion allowing the clutching movement of the treadle (hereinafter referred to) to precede any movement of the hub 23 away from the washer.

The pulley 53 being of fixed diameter some means must be provided to keep the belt 51 taut irrespective of change of the diameter of the pulley 17, 25. For this purpose the bracket 3 has mounted on its lower end a bell crank lever 61 one arm 63 of which carries at its upper end an idle or take-up pulley 65 and the other arm 67 of which carries a small adjustable weight 69, the arrangement being such that the idle pulley is always held against the slack side of the belt 51, and that the pressure of the belt on the pulley 17, 25 constantly tends to reduce the diameter of that pulley by forcing the member 21 outwards and thus to reduce the speed of the machine to the minimum. A lug 64 on the arm 63 is adapted to contact with the boss 5 and so limit the movement of the idle pulley 65 under action of the weight 69.

As already stated the rib 17 and 25 intermesh with one another so that the member 21 is constantly driven by the pulley 11, but as it would entail considerable manufacturing expense to cause each rib to fit snugly between the corresponding ribs of the adjacent member, it is preferred to attach to one of the ribs of one member, as illustrated the member 21, a plate 24 (Figure 3) which is fitted between two adjacent ribs of the other member, whereby the member 21 will be driven constantly by the pulley 11 without backlash, the plate 24 being of sufficient size to perform its function adequately whatever be the axial position of the member 21.

Connected to the free end of the arm 41 is a shackle 46 to which is pivoted a rod 47 connected by an adjusting nut 48 to a rod 49 which at its upper end is connected to the trip lever 55 of a clutch 56 of the type which de-clutches (when the trip lever is operated in one direction) always at a definite point in the cycle of operations, a brake 56ª being automatically applied on such de-clutching to the moving parts, driven by the shaft 2, so as to bring them to rest at or near a predetermined position in their cycle. A spring 57 tends to rock the trip lever 55 always into its uppermost or de-clutching position and to raise the treadle rod and swing the arm 37 anti-clockwise as seen in Figure 1.

On starting the machine, depression of the treadle first causes clutching, the pulley 17, 25 being then at its minimum diameter, while on further depression of the treadle the roll 39 comes into contact with the face 22, and the member 21 is forced inwardly by the roll to increase the diameter of the pulley and consequently the speed of the machine, the pulley diameter being governed by the amount of the depression of the treadle. On releasing the treadle the rod 45 is free to move upwardly and consequently the member 21 is free to move outwardly under the pull of the belt and reduce the diameter of the pulley 17, 25. At the same time the trip lever 55, being no longer held downwardly by the treadle, will be free, when the right moment in the cycle comes, to move upwardly under action of its spring 57 and when it does so it will lift the arm 41 and carry the roll 39 to its outermost position, is being understood that there is sufficient freedom of movement between the rod 47 and the member 41 to allow the hub 23 to move up to the washer 32.

It will be seen that the above-described construction is one that is readily applicable to various existing machines and is compact, simple and comparatively inexpensive to manufacture; that it can be operated from a single control with little expenditure of force upon the part of the operator; that the operator is compelled to start the machine driven by the mechanism at a low speed and cannot stop it until the speed has been reduced to that low speed, although the machine may be operated between starting and stopping at such speeds as the varying conditions of the work require.

Having thus described my invention, what I claim as new and desire to secure by Letters Patent of the United States is:

1. A variable speed driving and stopping mechanism having, in combination, a driven pulley of fixed diameter, a variable-diameter driving pulley, a belt connecting these pulleys, an automatic take-up for the belt, a driven shaft operated from said driven pulley, and a device for stopping the driven shaft in a definite position, said device being connected with the variable speed driving mechanism so as to come into action only when said variable driving mechanism is in a given condition.

2. A variable speed driving and stopping mechanism having, in combination, a driven pulley of fixed diameter, a variable-diameter driving pulley, an actuator for varying the diameter of said pulley, a belt connecting these pulleys, an automatic take-up for the belt, a driven shaft operated from said driven pulley, a device for stopping the driven shaft in a definite position and connections between said actuator and the stopping device constructed and arranged to operate the stopping device only after the effective diameter of the variable-diameter pulley has been reduced to a minimum.

3. A variable speed driving and stopping mechanism having, in combination, a driven pulley of fixed diameter, a variable-diameter driving pulley, a belt connecting these pulleys, members engaging the belt and the variable-diameter pulley and operative both to change the effective diameter of the driving pulley and to take up the belt slack, a driven shaft operated from said driven pulley, a device for stopping the driven shaft in a predetermined position and an operator-controlled member for controlling both the variable speed driving mechanism and the stopping device in predetermined sequence.

4. A variable speed driving and stopping mechanism having, in combination, a driven pulley of fixed diameter, a variable-diameter driving pulley consisting of opposed, intermeshing, coned, pulley parts, said pulleys being operatively connected, means operative to change the effective diameter of the driving pulley, thereby changing the speed of the driven pulley, a driven shaft operated from said driven pulley, a device for stopping the driven shaft in a predetermined position and an operator-controlled member for controlling the variable speed driving mechanism and the stopping device in predetermined sequence.

5. A variable speed driving and stopping mechanism having, in combination, a driven pulley of fixed diameter, a variable-diameter driving pulley, said pulleys being operatively connected, means operative to change the effective diameter of the driving pulley, thereby changing the speed of the driven pulley, a driven shaft operated from said driven pulley, a device for stopping the driven shaft in a predetermined position and an operator-controlled member for controlling the variable speed driving mechanism and the stopping device, said stopping device being connected with the variable speed driving mechanism in such a manner as to come into action only when the variable speed driving mechanism is in a given condition.

6. A variable speed driving and stopping mechanism having, in combination, a driven pulley of fixed diameter, a variable diameter driving pulley consisting of opposed, intermeshing, coned, pulley parts, said pulleys being operatively connected, means operative to change the effective diameter of the driving pulley, thereby changing the speed of the driven pulley, means by which the minimum diameter at which the variable diameter pulley may be set is predetermined, a driven shaft operated from said driven pulley, a device for stopping the driven shaft in a predetermined position, and an operator controlled member for controlling the variable speed driving mechanism and the stopping device, said stopping device being connected with the variable speed driving mechanism in such a manner as to come into action only when the variable diameter pulley has reached its predetermined, minimum diameter.

In testimony whereof I have signed my name to this specification.

JOSEPH GOULDBOURN.